United States Patent [19]
Varadarajan et al.

[11] Patent Number: 6,034,142
[45] Date of Patent: *Mar. 7, 2000

[54] METHOD FOR RECYCLING AROMATIC POLYCARBONATES

[75] Inventors: Godavarthi Satyanarayana Varadarajan, Niskayuna; Joseph Anthony King, Jr., Schenectady, both of N.Y.; Bhaskar Bhairavnath Idage, Pune, India; Swaminathan Sivaram, Pune, India; Vishnu Ramchandra Ranade, Pune, India

[73] Assignee: General Electric Company, Schenectady, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/989,458

[22] Filed: Dec. 12, 1997

[51] Int. Cl.$^7$ ............................... C08J 11/04; C08J 11/20
[52] U.S. Cl. ..................... 521/41; 521/48; 528/196; 528/480; 525/461; 525/439
[58] Field of Search .................. 521/41, 48; 528/196, 528/480; 525/461, 439

[56] References Cited

U.S. PATENT DOCUMENTS

| | | | |
|---|---|---|---|
| 4,948,871 | 8/1990 | Fukuoka et al. | 528/196 |
| 5,204,377 | 4/1993 | Fukuoka et al. | 521/918 |
| 5,266,659 | 11/1993 | Sivaram et al. | 598/196 |
| 5,652,275 | 7/1997 | Buysch et al. | 521/48 |
| 5,717,056 | 2/1998 | Varadarajan et al. | 528/196 |

FOREIGN PATENT DOCUMENTS

| | | |
|---|---|---|
| 0509358 | 10/1992 | European Pat. Off. . |
| 1173250 | 7/1964 | Germany . |
| 4009308 | 9/1991 | Germany . |
| 4009496 | 9/1991 | Germany . |

*Primary Examiner*—James J. Seidleck
*Assistant Examiner*—Olga Asinovsky
*Attorney, Agent, or Firm*—Robert T. Barker; Noreen C. Johnson

[57] ABSTRACT

Polycarbonates are recycled without the need for chemical modification by dissolution in a solvent followed by removal of any insoluble materials and precipitation by addition of a non-solvent. The precipitation step may be followed by solid state polymerization of the recycled polycarbonate. Particularly when solid state polymerization is to be performed, the use of a combination of solvent and non-solvent which produces a crystalline intermediate is performed, and use of a modifying reagent increasing the hydroxy end group concentration of the polycarbonate may be advantageous.

20 Claims, No Drawings

METHOD FOR RECYCLING AROMATIC POLYCARBONATES

BACKGROUND OF THE INVENTION

This invention relates to the recycling and reuse of aromatic polycarbonates.

Recycling of plastics is of increasing interest with the heightened environmental concerns currently felt. In addition, there is potential for recycle being more economical than disposal of used polymer and synthesis of new polymer to replace it.

Aromatic polycarbonates are in use in a wide variety of high volume areas. Among these are in the fabrication of transparent sheeting which may be used as a substitute for glass, and in the fabrication of optical disks used to transmit data.

Various methods for recycle of polycarbonate have been described. However, most if not all of them involve chemical reactions which degrade the polycarbonate, optimally to monomeric bisphenol which can be purified and reconverted to polycarbonate.

It would be more convenient to recycle the polycarbonate by simple purification means, which have the potential for being much cheaper than conversion to monomer and repolymerization. Moreover, since some molecular weight degradation can take place during use, it would be desirable to increase the molecular weight during recycle. Such recycle operations would be useful for both end use polycarbonate and polycarbonate recovered as drips from extruders and the like.

SUMMARY OF THE INVENTION

The present invention provides a recycle method which may be used in connection with the above-described applications. It provides an easy method for recycle without substantial degradation, combined where necessary with increase in molecular weight.

The invention is a method for recycling an aromatic polycarbonate which comprises:

(A) dissolving a solid, amorphous aromatic precursor polycarbonate in a chlorinated hydrocarbon as solvent to form an amorphous polycarbonate solution, (B) removing any insoluble materials from said amorphous polycarbonate solution, and (C) precipitating solid purified polycarbonate from said amorphous polycarbonate solution by addition of an organic non-solvent therefor.

DETAILED DESCRIPTION; PREFERRED EMBODIMENTS

Precursor polycarbonates which may be recycled by the method of this invention typically comprise structural units of the formula:

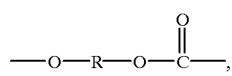

(I)

wherein at least about 60% of the total number of R groups are aromatic organic radicals and the balance thereof are aliphatic, alicyclic, or aromatic radicals. Preferably, each R is an aromatic organic radical and more preferably a radical of the formula:

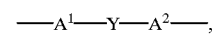

(II)

wherein each $A^1$ and $A^2$ is a monocyclic divalent aryl radical and Y is a bridging radical in which one or two carbon atoms separate $A^1$ and $A^2$. Such radicals are derived from dihydroxyaromatic compounds of the formulas HO—R—OH and HO—$A^1$—Y—$A^2$—OH respectively. For example, $A^1$ and $A^2$ generally represent unsubstituted phenylene, especially p-phenylene which is preferred, or substituted derivatives thereof. The bridging radical Y is most often a hydrocarbon group and particularly a saturated group such as methylene, cyclohexylidene, or isopropylidene which is preferred. Thus, the most preferred polycarbonates are those derived entirely or in part from 2,2-bis(4-hydroxyphenyl) propane, also known as "bisphenol A".

The precursor polycarbonate may be a homopolycarbonate or a copolycarbonate. For the purpose of the invention, copolycarbonates include copolyestercarbonates, an art-recognized class of copolymers which contain both carbonate units and ester units derived, for example, from isophthalic or terephthalic acid.

The precursor polycarbonate may be in the form of an article or plurality of articles, such as optical disks or sections of polycarbonate sheeting. It may also be a waste material such as extruder drips or wastes in solid form. The only requirements are that it be solid and amorphous and have a molecular weight typical of a polymer. Illustrative weight average molecular weights (as determined by gel permeation chromatography) are in the range of about 5,000–300,000.

In step A of the method of this invention, the precursor polycarbonate is dissolved in a chlorinated hydrocarbon as solvent. Illustrative chlorinated hydrocarbons are methylene chloride, chloroform, 1,2-dichloroethane, chlorobenzene and o-dichlorobenzene. The chloroaliphatic hydrocarbons are preferred, with methylene chloride and 1,2-dichloroethane being most preferred.

Dissolution of the precursor polycarbonate in the solvent may take place at any temperature. Typical temperatures are from about 0° C. to the boiling point of the solvent, with about 20–100° C. generally being preferred. So long as an amount of solvent effective to dissolve the polycarbonate is employed, its proportion is not critical.

Dissolution of the precursor polycarbonate generally leaves behind various insoluble materials, as illustrated by metallic coatings when the precursor polycarbonate is from optical disks, for example. In step B, said insoluble materials are removed from the polycarbonate solution. This may be achieved by such conventional operations as decantation, filtration and centrifugation.

The precursor polycarbonate is frequently associated with colored impurities, which may appear in the polycarbonate itself or in the solution thereof in the chlorinated solvent. Various embodiments of the invention, therefore, include a step of removing color from the amorphous polycarbonate solution following step B. One method for color discharge is treatment while in solution with a mineral acid, preferably hydrochloric acid, said acid typically being in solution in an alkanol such as methanol. Another is contact of said solution with a solid that absorbs color bodies, such as activated charcoal or a crosslinked resin, which may be neutral or may be an ion exchange resin. Another method of color discharge is washing of the resin, after precipitation as described hereinafter, with non-solvent in an amount sufficient to dissolve color bodies.

Many commercially employed polycarbonates are endcapped with a monohydroxyaromatic compound such as phenol or p-cumylphenol. Such an endcapping agent, when present, can inhibit solid state polymerization. Therefore, it is frequently preferred to add during the dissolution step at least one dihydroxyaromatic or dihydroxyaliphatic compound as a modifying reagent to produce hydroxy end groups. Suitable compounds include resorcinol, hydroquinone, catechol, bisphenols, ethylene glycol, propylene glycol, pentaerythritol, glycerol, glyceryl monopalmitate and glyceryl monostearate, with catechol and bisphenol A often being preferred.

The proportion of modifying reagent is generally a proportion at least theoretically effective to convert the amorphous polycarbonate in the solution to a material having about 20–80% (by number), preferably 40–60%, hydroxy end groups. A suitable proportion may be determined by simple experimentation.

In step C, purified polycarbonate is precipitated from the amorphous polycarbonate solution by addition of an organic non-solvent therefor. Suitable non-solvents include aliphatic hydrocarbons such as n-hexane, n-heptane and petroleum ether; aromatic hydrocarbons such as toluene and xylene; hydroxyaliphatic compounds such as methanol, ethanol, ethylene glycol and diethylene glycol; aliphatic ketones such as acetone and methyl ethyl ketone; and carboxylic acid esters such as ethyl acetate and n-butyl acetate. Upon addition of the non-solvent to the polycarbonate solution, the polycarbonate precipitates and may be separated by filtration or one of the other separation options described hereinabove. When removal of color bodies by washing is to be conducted after precipitation, one of the same non-solvents suggested for use in the precipitation step may be employed.

It is often preferred, particularly when solid state polymerization is subsequently to be employed, to employ a non-solvent which produces a crystalline polycarbonate. The presence of crystallinity may be detected by treatment under conditions which afford a polycarbonate film; a cloudy film indicates some degree of crystallinity in the polycarbonate. Among the non-solvents which produce crystallinity in combination with 1,2-dichloroethane, for example, are alkyl carboxylate esters such as ethyl acetate.

When a purified polycarbonate having an enhanced crystallinity is desired, a crystallinity in the range of about 10–30% and especially about 10–20% is generally preferred. Crystallinity values higher than about 30% are generally not preferred when solid state polymerization is to be performed, since polymerization may be very slow at such high crystallinity values. Crystallinity proportions may be determined by powder X-ray diffraction, comparing a completely amorphous polymer and a crystallized polymer as described, for example, in U.S. Pat. No. 4,948,871 with reference to drawings not forming part of the patent but present in its file. The disclosures of said patent and said drawings are incorporated by reference herein.

The proportion of crystallinity in the purified polycarbonate will depend to some extent on the identities of the solvent and non-solvent employed. More particularly, a specific group of non-solvents may impart crystallinity when employed with a specific solvent but not with another solvent. When 1,2-dichloroethane is employed as a solvent, for example, ethyl acetate is particularly effective as a crystallinity enhancing non-solvent. The identities of suitable non-solvents for this purpose and for use with any other suitable solvent can be determined by simple experimentation.

The purified polycarbonate obtained by the method of this invention most often has an intrinsic viscosity in the range of about 0.35–0.45 dl/g, as determined in chloroform at 25° C. If a product with higher intrinsic viscosity is desired, the purified polycarbonate may be subjected to solid state polymerization.

Solid state polymerization may be effected at a temperature between the glass transition temperature and the melting temperature of the crystalline purified polycarbonate, most often about 10–50° C. below its melting temperature. In general, temperatures in the range of about 150–270° and especially about 180–250° C. are suitable. As disclosed in U.S. Pat. Nos. 4,948,971, 5,204,377 and 5,266,659 and in copending, commonly owned application Ser. No. 08/787, 740, the disclosures of which are incorporated by reference herein, the solid state polymerization step may be achieved in the absence or presence of catalysts. Suitable catalysts include basic salts, transition metal oxides and alkoxides, quaternary ammonium bioxyanion salts and tetraalkylammonium and tetraalkylphosphonium carboxylates. Catalysts proportions are usually about 10–200 ppm based on purified polycarbonate.

Solid state polymerization may be conducted in a mixer capable of producing intimate gas-solid contact, such as a fixed bed, fluidized bed or paddle mixer, in contact with an inert gas such as nitrogen or argon which serves as the fluidizing gas if a fluidized bed is employed. Said inert gas may serve one or both of the purposes of fluidizing the mixture and volatilizing and removing volatile byproducts, including water and any volatile carbonate formed. Programmed heating may be advantageously employed. As an alternative to conditions of intimate gas-solid contact, the polymerization may be conducted at reduced pressure, typically less than about 100 torr, preferably with efficient mixing.

The method of this invention is illustrated by the following examples. Intrinsic viscosities were determined in methylene chloride at 20° C.

EXAMPLE 1

A 100-g sample of bisphenol A polycarbonate recovered from extruder drips was dissolved in 700 ml of 1,2-dichloroethane at 80° C., with vigorous stirring. The solution was centrifuged and the solid residue was removed and discarded. Ethyl acetate was added to the polycarbonate solution to precipitate the polycarbonate as a crystalline solid, which was separated, washed with ethyl acetate until colorless and dried in vacuum at 80° C. The product had an intrinsic viscosity of 0.43 dl/g, a glass transition temperature of 143° C., a melting temperature of 226° C. and a crystallinity of 30%.

EXAMPLE 2

A 10-g sample of polycarbonate-containing regrind material from optical disks was dissolved in 100 ml of 1,2-dichloroethane at 80° C., with vigorous stirring. The solution was filtered and purified polycarbonate was precipitated from the filtrate by the addition of methanol. The precipitated polycarbonate was separated by filtration, washed twice with methanol and vacuum dried at 80° C. The recycled polycarbonate thus obtained had an intrinsic viscosity of 0.36 dl/g, a glass transition temperature of 143° C., a melting temperature of 223° C. and a crystallinity of 24%.

EXAMPLE 3

A 10-g sample of a recovered polycarbonate similar to the product of Example 1 is dissolved in 100 ml of ethyl acetate and 100 mg of catechol and 1 mg of tetramethylammonium maleate are added. The mixture is heated under reflux for 2 hours, after which the ethyl acetate is removed by distillation and the material is dried at 80° C. The resulting crystallized polycarbonate is heated in a fluidized bed reactor in a nitrogen flow of 3 l/min, at 180° C. for 30 minutes, 210° C. for 2 hours and 230° C. for 4 hours. The resulting polycarbonate has an intrinsic viscosity of 0.76 dl/g, a glass transition temperature of 156° C., a melting temperature of 264° C. and a crystallinity of 34%.

What is claimed is:

1. A method for recycling an aromatic polycarbonate which comprises:
    (A) dissolving a solid, amorphous aromatic precursor polycarbonate in a chlorinated hydrocarbon as solvent to form an amorphous polycarbonate solution, wherein step A is performed at a temperature in the range of about 20–100° C.,
    (B) removing any insoluble materials from said amorphous polycarbonate solution, and
    (C) precipitating solid purified polycarbonate from said amorphous polycarbonate solution by addition of an organic non-solvent therefor.

2. A method according to claim 1 wherein the precursor polycarbonate is a homopolycarbonate.

3. A method according to claim 2 wherein the homopolycarbonate is a bisphenol A polycarbonate.

4. A method according to claim 1 wherein the precursor polycarbonate is a copolycarbonate.

5. A method according to claim 1 wherein the precursor polycarbonate is a copolyestercarbonate.

6. A method according to claim 1 wherein the chlorinated hydrocarbon is methylene chloride or 1,2-dichloroethane.

7. A method according to claim 1 wherein step B comprises decantation, filtration or entrifugation.

8. A method according to claim 1 which further comprises the step of removing color from said amorphous polycarbonate solution following step B.

9. A method according to claim 8 wherein color is removed by treatment with a mineral acid while in solution.

10. A method according to claim 9 wherein the mineral acid is hydrochloric acid in solution in an alkanol.

11. A method according to claim 8 wherein color is removed by contact with a solid that absorbs color bodies.

12. A method according to claim 11 wherein said solid is activated charcoal or a crosslinked resin.

13. A method according to claim 5 wherein step A is performed in the presence of at least one dihydroxyaromatic or dihydroxyaliphatic compound as a modifying reagent.

14. A method according to claim 13 wherein the modifying reagent is a dihydroxyaromatic compound.

15. A method according to claim 14 wherein the modifying reagent is catechol or bisphenol A.

16. A method according to claim 1 wherein the non-solvent employed in step C is an aliphatic hydrocarbon, aromatic hydrocarbon, hydroxyaliphatic compound, aliphatic ketone or carboxylic acid ester.

17. A method according to claim 16 wherein the non-solvent is an organic compound which, when employed in combination with said solvent, produces a purified polycarbonate having a crystallinity of at least about 10%.

18. A method according to claim 17 wherein the non-solvent is an alkyl carboxylate ester.

19. A method according to claim 17 further comprising the step of polymerizing said solid purified polycarbonate by solid state polymerization.

20. A method for preparing aromatic polycarbonate comprising:
    a) dissolving a solid, amorphous aromatic precursor polycarbonate in a chlorinated hydrocarbon solvent to form an amorphous polycarbonate solution;
    b) removing insoluble materials from the amorphous polycarbonate solution;
    c) precipitating solid purified polycarbonate from the amorphous polycarbonate solution by addition of an organic non-solvent therefor;
    d) crystallizing the solid purified polycarbonate; and
    e) solid state polymerizing the solid purified polycarbonate.

* * * * *